(12) United States Patent
Pieczul et al.

(10) Patent No.: US 9,462,068 B2
(45) Date of Patent: Oct. 4, 2016

(54) CROSS-DOMAIN INACTIVITY TRACKING FOR INTEGRATED WEB APPLICATIONS

(71) Applicant: International Business Machines Corporation, Armonk, NY (US)

(72) Inventors: Olgierd Stanislaw Pieczul, Dublin (IE); Brent Allan Hepburn, Boston, MA (US); David Scott Kern, Billerica, MA (US); Mark McGloin, Dublin (IE); Mark Lawrence Rovelli, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 14/028,214

(22) Filed: Sep. 16, 2013

(65) Prior Publication Data

US 2015/0081876 A1    Mar. 19, 2015

(51) Int. Cl.
G06F 15/173    (2006.01)
H04L 29/08     (2006.01)
G06F 11/36     (2006.01)

(52) U.S. Cl.
CPC ............... *H04L 67/22* (2013.01); *G06F 11/36* (2013.01)

(58) Field of Classification Search
None
See application file for complete search history.

(56) References Cited

U.S. PATENT DOCUMENTS

| 8,131,861 | B2 | 3/2012 | Butler et al. |
| 8,200,816 | B2 | 6/2012 | Izrailevsky et al. |
| 8,813,174 | B1* | 8/2014 | Koeten ............... H04L 41/022 709/223 |
| 9,201,759 | B2* | 12/2015 | Wintergerst .......... G06F 11/362 |
| 2010/0043065 | A1* | 2/2010 | Bray .................. H04L 63/0815 726/8 |
| 2012/0167118 | A1* | 6/2012 | Pingili .................. G06F 1/3206 719/318 |
| 2013/0024922 | A1 | 1/2013 | Rodriguez |
| 2013/0254847 | A1* | 9/2013 | Adams ................ G06F 21/6218 726/4 |
| 2013/0298037 | A1* | 11/2013 | Matthews, III ....... G06F 3/0484 715/753 |
| 2013/0303143 | A1* | 11/2013 | Schrader ........... H04M 1/72577 455/418 |
| 2014/0142984 | A1* | 5/2014 | Wright .................. G06F 19/321 705/3 |
| 2014/0282877 | A1* | 9/2014 | Mahaffey ............ H04L 63/0853 726/3 |
| 2014/0325061 | A1* | 10/2014 | Morgan .................. H04L 12/00 709/224 |
| 2015/0007263 | A1* | 1/2015 | Stewart ............... H04L 63/0815 726/3 |
| 2015/0033205 | A1* | 1/2015 | Wintergerst .......... G06F 11/362 717/124 |
| 2015/0172150 | A1* | 6/2015 | Ding ...................... H04L 67/42 709/203 |

* cited by examiner

*Primary Examiner* — Viet Vu
*Assistant Examiner* — James Edwards
(74) *Attorney, Agent, or Firm* — David B. Woycechowsky; David H. Judson

(57) ABSTRACT

In a cloud computing environment, a user authenticates to multiple cloud services concurrently. A master service has knowledge of or tracks the cloud service(s) to which a user is authenticated. Each cloud service may enforce its own inactivity period, and the inactivity period of at least first and second cloud services may be distinct from one another. When the master service receives an indication that the authenticated user is attempting to take an action at a first cloud service despite an activity timeout there, the master service issues a status request to at least the second cloud service to determine whether the user is still active at the second cloud service (despite its different inactivity period). If the user is still active at the second cloud service, the master service provides a response, selectively overriding (re-setting) the activity timeout at the first cloud service to permit the action.

18 Claims, 5 Drawing Sheets

CROSS-DOMAIN INACTIVITY TRACKING FOR INTEGRATED WEB APPLICATIONS

BACKGROUND OF THE INVENTION

1. Technical Field

This disclosure relates generally to securing information in a cloud computing or other shared deployment environment wherein disparate parties share Information Technology (IT) resources.

2. Background of the Related Art

One commonly overlooked component of a traditional computing user experience is based around activity and inactivity. As is well-known, desktop computers dim screens and spin down hard drives to save power, many devices activate password-protected screensavers to prevent passers-by from exploiting an empty desk, and many servers will automatically log out a client that has remained idle for too long. This sort of behavior is generally expected and tolerated by end users, and is often mandated as well by many IT security administrators.

Moving away from the desktop and onto the network, many reverse proxies and gateways also are capable of enforcing inactivity timeouts across all traffic crossing their boundaries. These inactivity monitoring techniques are useful, but they require all of a single user's traffic to flow through a single (logical) device or closely-coupled devices sharing memory state or low-latency network connectivity. Unfortunately, these types of assumptions do not scale naturally into a widely distributed cloud computing environment. As is well-known, cloud computing is an emerging information technology (IT) delivery model by which shared resources, software and information are provided over the Internet to computers and other devices on-demand. A cloud compute environment, such as IBM SmartCloud® for Social Business (formerly known as LotusLive®), presents to the user as a single unified experience; in operation, the end user logs-in once against a centralized authentication component, and then transparently signs-on (e.g., via SAML (Security Assertion Markup Language)-based authentication and authorization techniques) into different components of the service. The different components may run on different subdomains in different physical cages in different data centers in different parts of the world, all running on different hardware with different proxy/gateway/session management capabilities and different back-end technologies. Single clicks on a common "banner bar" can transparently redirect a user between different services without need for separate login, as well as log the user out of all of the components to which he or she has authenticated during that session. In these types of environments, users do not necessarily know (or indeed care) where the back-end servers they are contacting live, because the entire service is being presented to them as a single unified whole. Thus, a user who is actively reading his or her e-mail in one web-based application, for example, would not expect to be logged out of a service being provided by another application to which he or she has been authenticated to during the session.

In a cloud compute environment of this type, it would not be expected that user traffic against a server component hosted, e.g., in a California data center, will not traverse the front-end web proxy used, for example, by a cloud business support service component located elsewhere. Likewise, user traffic against SmartCloud® Notes will never be seen by a reverse proxy for a web-based collaboration tool, such as SmartCloud® Connections. These types of cross-domain operations thus make it extremely difficult to track user activity or inactivity, especially since it may be very likely that a user will become "inactive" with respect to one service while still actively engaged in another service to which he or has been authenticated.

Cross-domain inactivity tracking for web applications that have been integrated in this manner across a cloud compute infrastructure thus presents significant technical challenges. Of course, client-side inactivity monitoring is well-developed in the prior art, as noted above. For example, browser-based cookie scoping and cross-site scripting (XSS) security controls prevent the user's browser from being trivially used to track the user's activity or inactivity state. That said, trusting client-side code to control service-based security, especially across a widely-distributed cloud compute infrastructure, is not an acceptable solution.

Server-side inactivity tracking solutions are also known. Thus, it is known to track inactivity across a set of services linked by common authentication, e.g., using a network authentication server that tracks a common network cookie. On every request, the cookie is updated to maintain a latest activity time. Generally, this approach provides an acceptable solution, but it entails a significant performance overhead due to the need to update the cookie so frequently. Another approach enables an administrator to view display of active sessions, thereby providing an indirect view of inactivity. This approach, however, does not operate in the context of a set of linked services. Finally, it is known in the SAML 2.0 specification to provide a means to specify an inactivity period for each service authenticating to a master authentication service.

These approaches are not scalable and have other inefficiencies. Therefore, there remains a new to provide a new approach to inactivity tracking that can be implemented across disparate compute stacks, such as those implemented by different teams on different technologies, and as may be expected to continue to grow as services of this type grow and incorporates new functionality and new products.

BRIEF SUMMARY

According to this disclosure, cross-domain inactivity tracking and management are provided in a cloud computing environment. In this environment, it is assumed that a user has authenticates to multiple cloud services. Each cloud service may enforce its own inactivity period (e.g., a timeout), and the inactivity period of at least first and second cloud services may be distinct from one another. A master service has knowledge of or tracks the cloud service(s) to which a user is authenticated. In operation, when the master service receives an indication that the authenticated user is attempting to take an action at a first cloud service despite an activity timeout there, the master service issues a status request to at least the second cloud service to determine whether the user is still active at the second cloud service (despite its different inactivity period). If the user is still active at the second cloud service, the master service provides a response back to the first cloud service, selectively overriding (re-setting) the activity timeout at the first cloud service to permit the action to take place. Thus, in this approach inactivity is only checked (by the master service) on an on-needed basis, which enables the solution to scale for use by many cloud services simultaneously without impacting performance.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
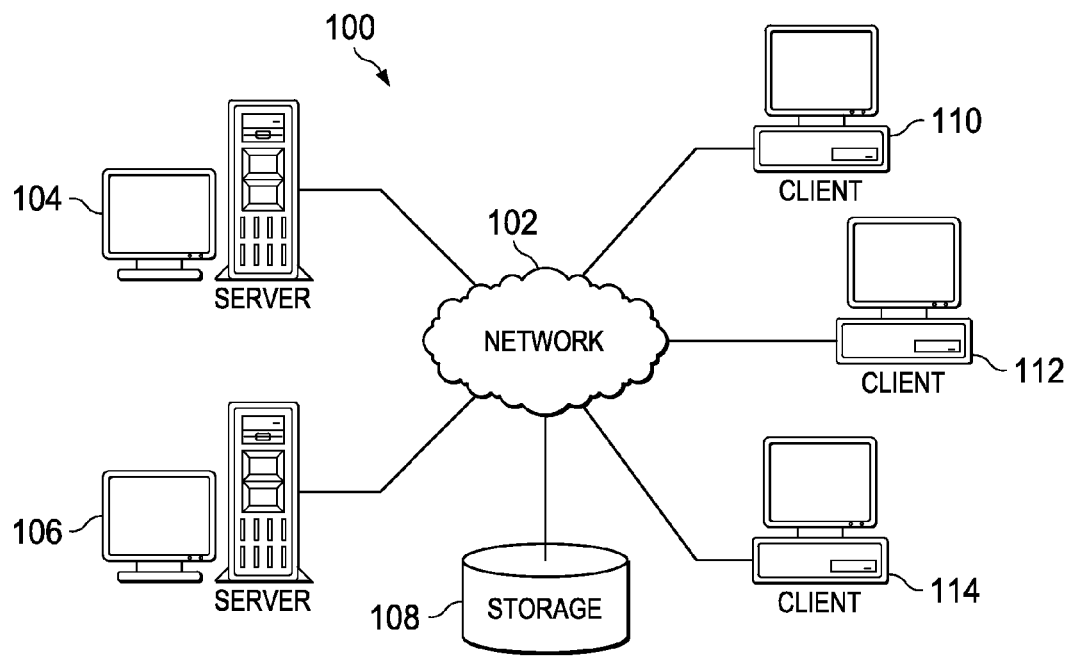
FIG. 1 depicts an exemplary block diagram of a distributed data processing environment in which exemplary aspects of the illustrative embodiments may be implemented.
Figure 2:
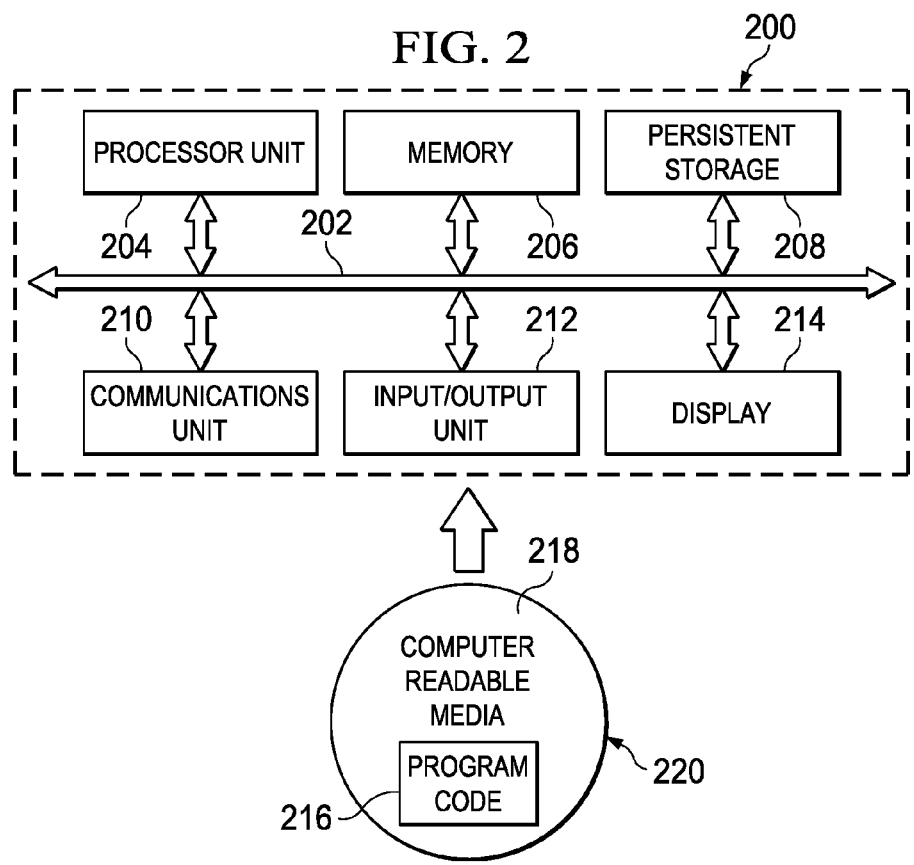
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2012, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
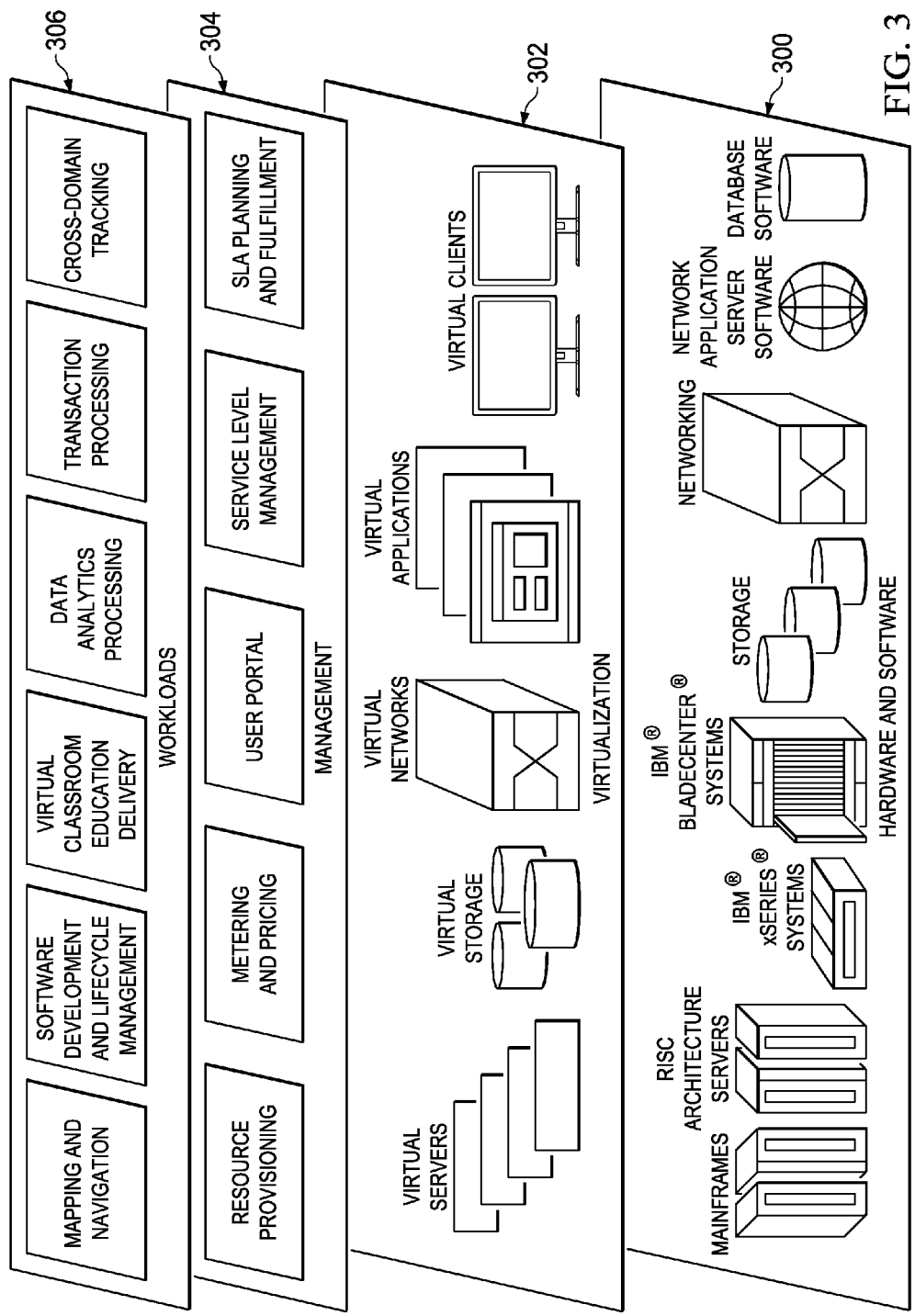
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to this disclosure, a cross-domain inactivity tracking service.

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

By way of example only, a representative enterprise application deployed in the cloud is a client-server application such as IBM® SmartCloud® for Social Business (formerly LotusLive), which provides a cloud-delivered suite of technologies that combine web conferencing, messaging, and collaboration services with social networking capabilities in an easy-to-use web-based environment. As a component of IBM® SmartCloud, Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using IBM SmartCloud) is merely representative. The techniques described below are not limited for use with a particular enterprise application deployed within the cloud environment.

Figure 4:
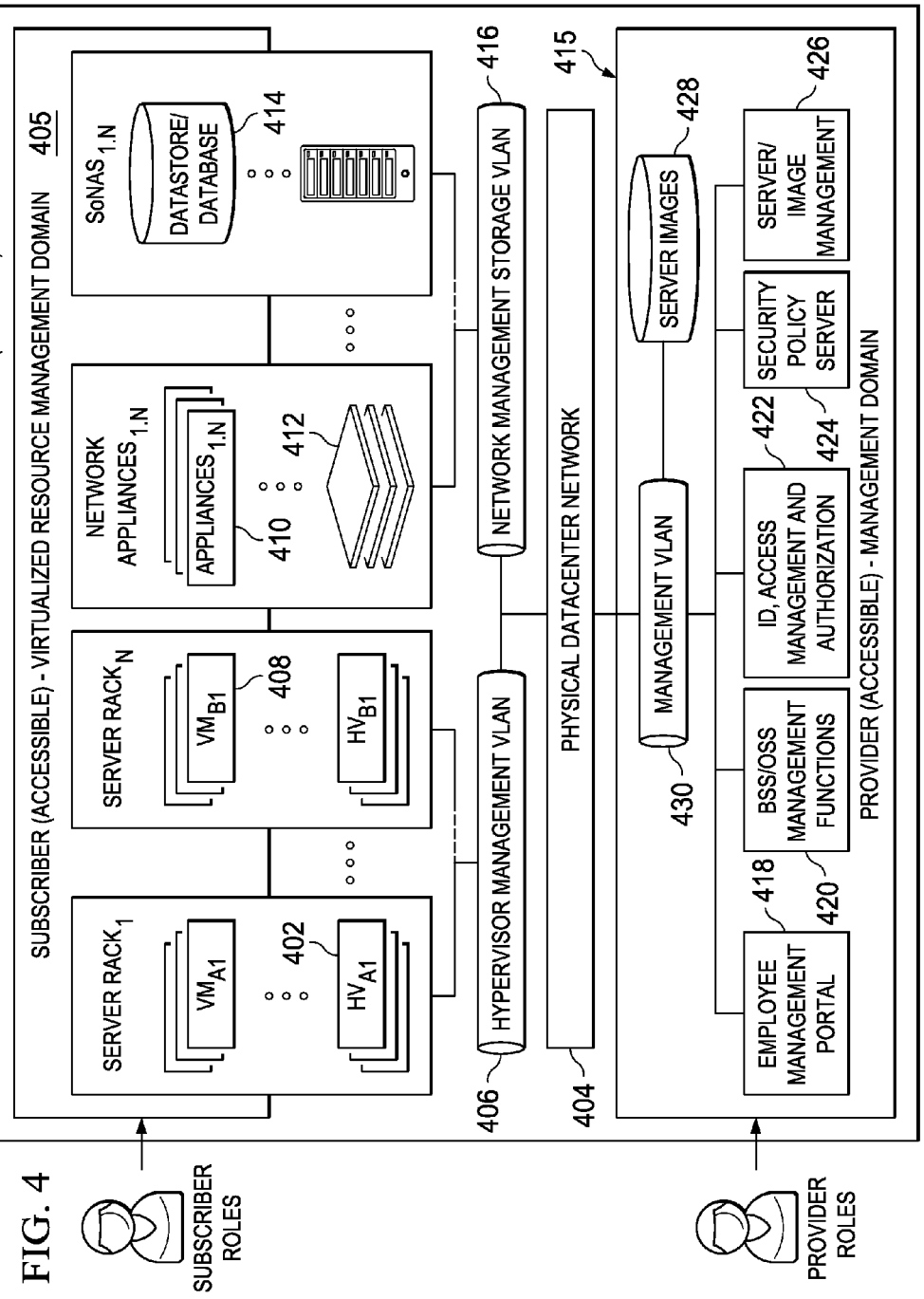
FIG. 4 illustrates an exemplary datacenter in which the cross-domain inactivity tracking protocol of this disclosure may be implemented.

FIG. 4 illustrates a typical IT infrastructure that supports virtualization of resources. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Appliance-Based Inactivity Monitoring

As noted above, user inactivity monitoring is a known technology. A representative data processing system in which such inactivity monitoring techniques might be implemented is a Service Oriented Architecture (SOA) appliance. SOA middleware appliances accelerate XML and Web services deployments while extending an existing SOA infrastructure across an enterprise. The utilization of middleware-purposed hardware and lightweight middleware stacks provides a secure, consumable packaging for implementing middleware SOA functions. Representative appliances include, without limitation, the DataPower® accelerator devices available from IBM of Armonk, N.Y., USA. A representative appliance of this type provides common XML message transformation, XML processing, integration, MQ/HTTP/FTP connectivity, transport mediation, and routing and security functions. Typically, the appliance is configured using a native web-based graphic user interface (WebGUI), such as a web browser. In a typical use case, the user also is responsible for appliance maintenance, such as to manually retrieve, back-up, and archive configuration.

Appliances of this type provide inactivity monitoring. In particular, techniques for web-based application logout typically set a logout timer, warn the user of an impending logout, and then delete the user's session on the appliance. Such devices have also been enhanced to provide a secure, layered logout, wherein each of a set of management objects associated with the data processing system are categorized into one or more security levels, with each security level having an associated view status and an associated security classification that, preferably, is event-based. Thus, a representative security level has an associated security classification that is triggered upon occurrence of one or more events. Upon occurrence of the event (or events, as the case may be), the security classification is "reached." Each status is independently configurable, and each associated security classification is independently configurable. Each security level preferably represents security sensitivity, and an object is categorized into a security level based on the sensitivity of what the object represents. Once the objects are categorized into the security levels, the inactivity timeout are used to control what objects are available to the user (and/or what actions can be taken with respect thereto) as events associated with the security classifications occur. By layering the security levels and controlling what objects are available to the user or what can be done with those objects, more nuanced logout strategies can be implemented.

Cross-Domain Inactivity Tracking for Integrated Web Applications

With the above as background, the subject matter of this disclosure is now described. According to this disclosure, a cross-domain inactivity tracking mechanism provides a way to track inactivity period(s) across a set of services to which a user is logged-into across multiple cloud-based sub-domains, and to enable the user to remain logged into a first service for which an inactivity timer has been exceeded based on the user's activity with respect to at least one second service at which the user remains active. The cross-domain inactivity tracking mechanism according to this disclosure may be added to (executed in) the provider infrastructure described above with respect to FIG. 3 or FIG. 4. The mechanism may be operated as a service itself that operates across the multiple domains in the cloud compute infrastructure.

In general, cross-domain inactivity tracking and management are provided in a cloud computing environment in which it is assumed that a user has authenticated to multiple cloud services. Each cloud service may enforce its own inactivity period (e.g., a timeout), and it is assumed that the inactivity period of at least first and second cloud services are assumed to be distinct from one another. Typically, an "inactivity period" is temporal (time-based) in nature, such that, as time passes from a particular start point, eventually a timeout is reached (an "inactivity timeout"). While a time-based monitor is the usual scenario, the inactivity may also be event-based, such that after a given number of configurable events, the inactivity trigger is met. For convenience, the remainder of this explanation describes the subject matter in the context of a temporal-based solution.

According to this disclosure, a "master service" has knowledge of or tracks the cloud service(s) to which a user is authenticated. The "master service" may be dedicated to the inactivity monitoring operation of this disclosure, it may be part of an existing cloud management functionality (e.g., BSS, OSS, or other directory service), or it may be an extension or adjunct to some other cloud function, operation or mechanism. In operation, when the master service receives an indication that the authenticated user is attempting to take an action at a first cloud service despite an activity timeout there, the master service issues a status request to at least the second cloud service to determine whether the user is still active at the second cloud service (despite its different inactivity period). If the user is still active at the second cloud service, the master service provides a response back to the first cloud service, selectively overriding (re-setting) the activity timeout at the first cloud service to permit the user action to take place.

Thus, and as one of skill in the art will fully appreciate, in this approach inactivity is only checked (by the master service) on an on-needed basis, which enables the solution to scale for use by many cloud services simultaneously without impacting performance.

Figure 5:
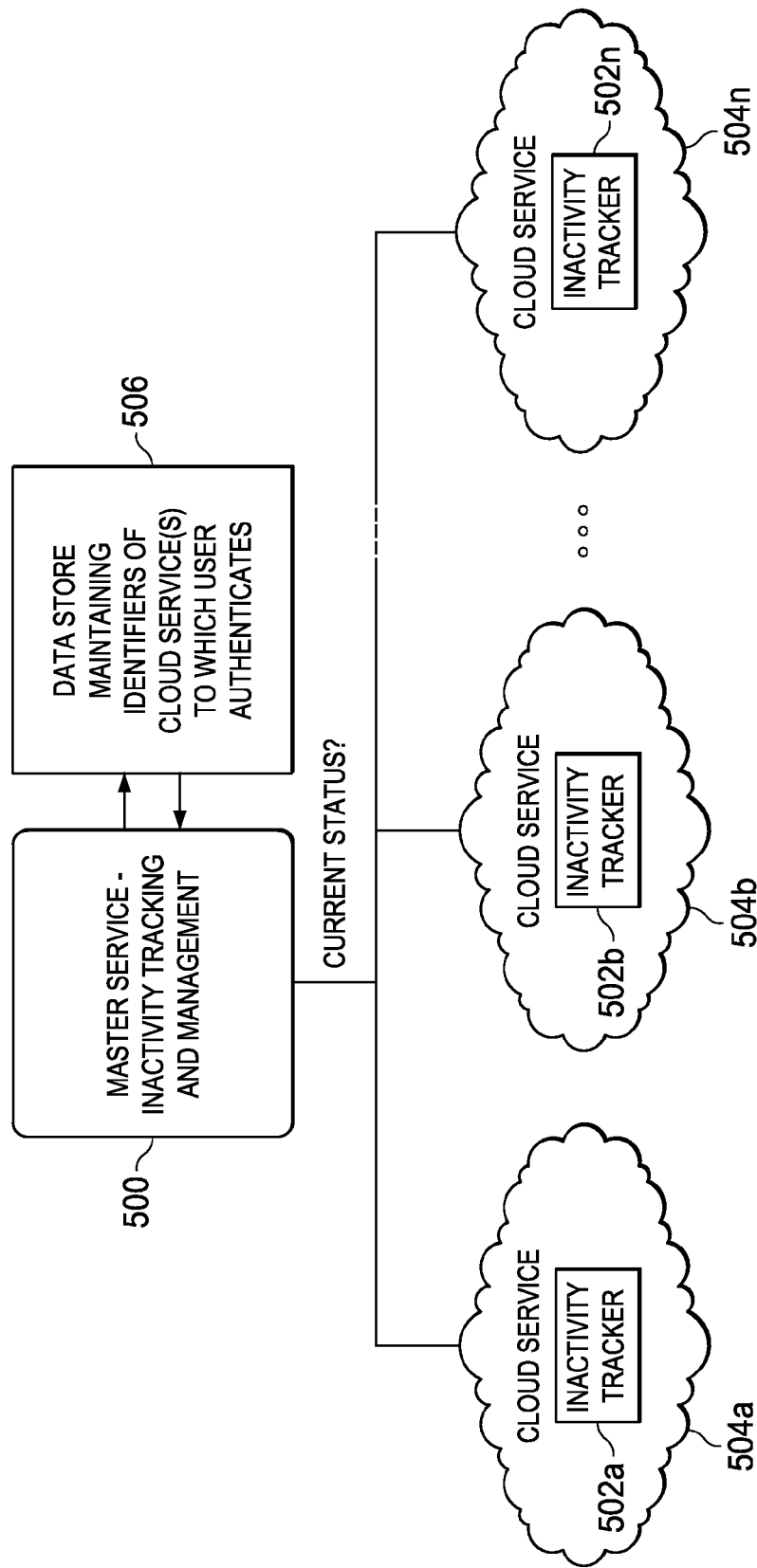
FIG. 5 illustrates a cross-domain inactivity monitoring system according to this disclosure.

FIG. 5 illustrates a representative embodiment of a cross-domain inactivity tracking mechanism. As seen in FIG. 5, the mechanism comprises a master service 500, and a set of inactivity trackers 502a-n operating across sub-domains of the cloud compute infrastructures. The inactivity tracker 502 may comprise part of an existing local tracking mechanism, such as described above, or it may be a standalone functionality that facilitates the operations described herein. As noted above, a particular inactivity tracker 502 may have its own inactivity protocol, and it may operate with local mechanisms (hardware, processes, program interfaces, databases, data structures, and the like). A particular cloud service 504 may have or may operate its own associated inactivity tracker, and the inactivity tracker tracks inactivity period(s) internally (locally) to that cloud service. Thus, in the example scenario, cloud service 504a has an inactivity tracker 502a associated therewith, cloud service 504b has an inactivity tracker 504b associated therewith, and so forth. This is not a limitation, as cloud services may share a particular inactivity tracker, or a particular cloud service may have multiple such inactivity trackers. The master service 500 has the capability to call out to each of the inactivity trackers 502 and request the activity (or inactivity) status of a particular user. Any suitable request-response protocol, such as HTTP, HTTPS, an application programming interface (API) call, a call using other REST-based protocols, or the like, may be used for this purpose. To that end, the master service 500 includes or has access to a database (or other data structure) 506 that stores information to track what cloud service(s) to which a particular user is authenticated. The master service thus knows or can ascertain the services to which a user is authenticated, and also the user's inactivity status with respect to each such cloud-based service.

In operation, when a particular service (e.g., service 504b, having local inactivity tracker 502b) to which the user desires to take an action determines that the user's action is outside (beyond) an inactivity window (in other words, that some relevant inactivity timeout has occurred), that service (recognizing that the local inactivity timeout has occurred) makes a call to the master service 500. The master service 500 receives the request from the service (in this example, service 504b), and master service 500 then examines its local database to identify one or more of the other cloud services (e.g., 504a) to which the user is then (or has been) authenticated. The master service 500 then issues a "status" request to each such identified cloud service(s) that it has identified to determine whether the requested cloud service considers the user to be currently active (or inactive) with respect to that service. Thus, in this example, if the user is inactive with respect to service 504b that receives the original user request, the master service 500 sends the status request to one or more of the other cloud services 504a, 504c, and so forth. Depending on the response or response(s) then received from the identified cloud service(s), the master service 500 may then take an action to override the original inactivity timeout.

As one embodiment, as long as any positive response is received from any of the other cloud services that indicates the user is still active (within a particular cloud service), then the master service 500 provides a response back to the original requesting service 504b indicating that the user is active. In so doing, the user's desired action at the service 504*b* is then permitted. How this permission is effected at the requesting service 504*b* will depend on the nature of the user's original request, but typically the response from the master service serves to override (and thus re-set) the inactivity timeout at service 504*b* (i.e., set it back to its initiation time). This override has the effect of making the user appear as if he or she is still active at that service (despite the earlier inactivity timeout).

In an alternative embodiment, more than one positive response is required to be received before the master service 500 overrides the original timeout that occurred in service 504*b*. In still another embodiment, whether or not the original timeout is overridden may depend on other factors, such as relative time differences, time-of-day, the identity of the responding cloud service(s), the nature of the response(s) from the responding cloud services, or other configurable criteria.

Generalizing, the master service has knowledge of or tracks the cloud service(s) to which a user is authenticated. Each cloud service may enforce its own inactivity period, and the inactivity period of at least first and second cloud services are assumed to be distinct from one another. When the master service receives an indication that the authenticated user is attempting to take an action at a first cloud service despite an activity timeout, the master service issues a status request to one or more other cloud services (including the second cloud service) to which the user has been authenticated to determine whether the user is still active at any such other cloud service(s). If the user is still active at any such cloud service, the master service provides a response to the indication, selectively overriding the activity timeout at the first cloud service to permit the action.

In effect, the master service tracks inactivity period(s) across a set of services in sub-domains to which it (the service) knows the user to be authenticated, and it operates to keep the user logged into one or more other cloud services even if the inactivity for a cloud service exceeds some specified limit. In this manner, the user is not required to re-authenticate, let alone repeatedly, as he or she continues to remain active, at least somewhere in the cloud. In other words, as the end user navigates across the domains in the cloud, a prior authentication can remain active with respect to multiple cloud services despite inactivity timeout(s) at individual ones of those services. The master service provides this functionality without requiring specialized tracking cookies or that the individual services actively ping the master (central) service.

Figure 6:
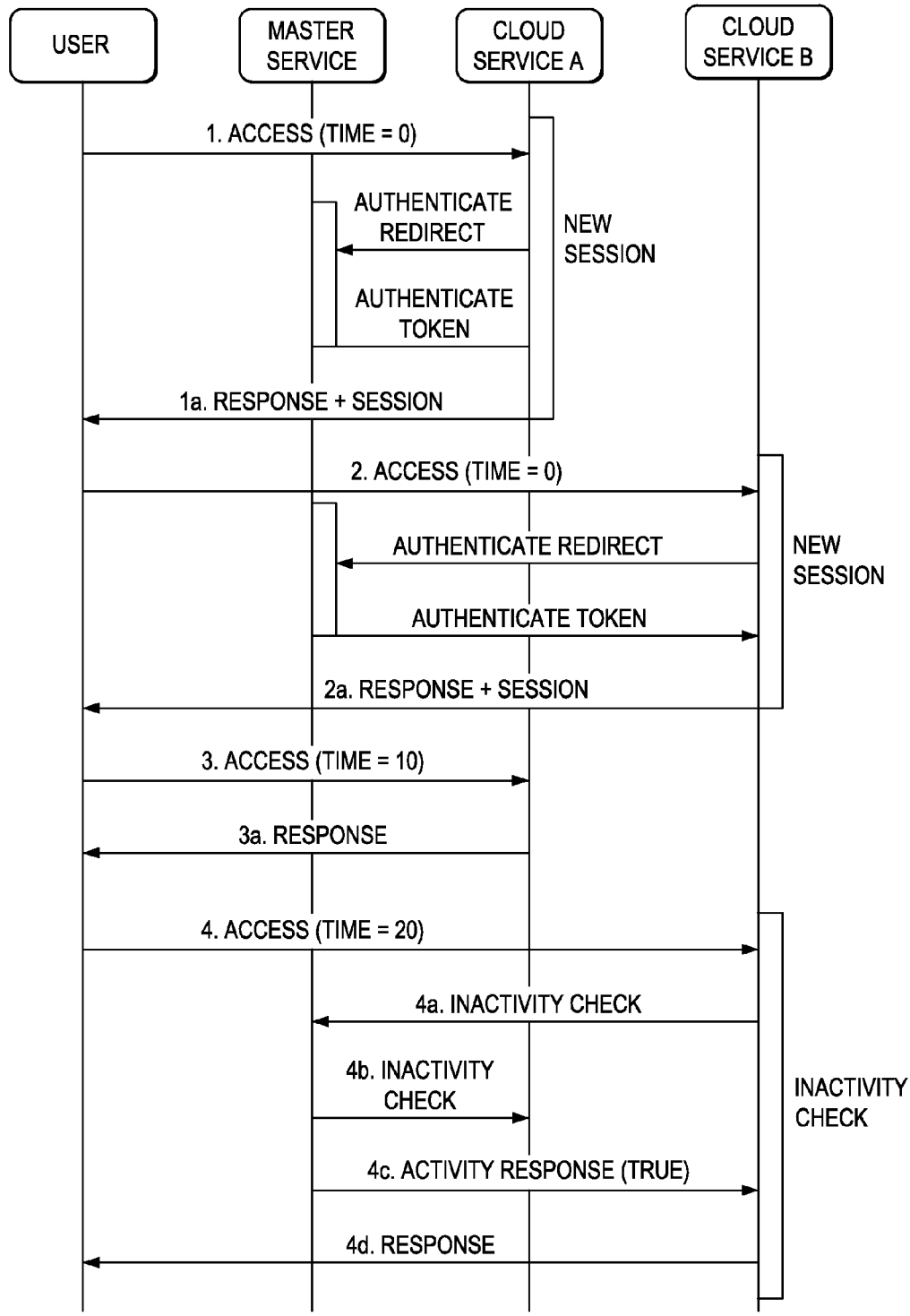
FIG. 6 illustrates a representative use case illustrating how the cross-domain inactivity tracking protocol of this disclosure operates.

FIG. 6 illustrates a concrete example scenario with a master service that provides and end user single-sign on (SSO) to a pair of cloud services, service A, and service B. In this example, it is assumed that the inactivity time across the system for both of the services is the same (e.g., 15 minutes). At step (1), at access time t=0, the user authenticates to service A, which redirects the user to the master service for SSO before creating a session in service A. At step (2), and at time=0, the user authenticates to service B, which redirects the user to the master service for SSO before a session in service B. Following SSO, the user now has a session with service A, as well as a session with service B. At step (3), which occurs ten (10) minutes into the active session, the user makes a service request to service A. Because no inactivity timeout has occurred (i.e., the session is still active there), the user receives a response immediately. At step (4), however, the user makes an access request to service B but, by this time (t=20 minutes), the inactivity timeout has occurred. Thus, according to this disclosure, at step (4a), service B makes a request to the master service to determine whether the user is still active elsewhere. The master service responds to this request by identifying service A as one of the other services to which the user is authenticated. Then, at step (4b), the master service sends a status request (the inactivity check) to service A. More generally, the master service queries each of the identified cloud services to determine whether the user is active there (i.e., whether the inactivity period has lapsed there). In one implementation, the master service calls an application programming interface (API) into the service and queries for the activity status at the remote service. Any suitable request-response protocol may be used as well. In this example, the user still appears to be active at service A because of the user's prior activity there that occurred just ten minutes earlier (step (3) above). Accordingly, the status check returns positive. As a result, at step (4c), the master service issues to service B an activity response (as true), indicating that the user is still active. At step (4d), service B resets the inactive time for the user and responds to the user's request to service B. This completes the processing Preferably, the master service caches responses (e.g., "service A reported that the user is active as of ten minutes ago") so that the service need not re-issue multiple status requests if it receives another call (to check for status) within the time period before the inactivity threshold (in this example, 15 minutes) is actually reached.

The information about what services the user is authenticated to may be retained in a data store, or in a data structure, such as a cookie, that may be passed in the request-response processing flow.

The individual cloud services may be quite varied, and they need not be part of the same application suite. One cloud service may be SaaS-based, while yet another may be PaaS-based, while still another may be IaaS-based.

The technique described herein provide significant advantages over the prior art. The approach is highly efficient and scalable, as it obviates communications between the cloud services and the master except as may be needed to determine whether a user is active. There is no requirement to instantiate or maintain (updated) a cookie that tracks inactivity across individual services, or to otherwise maintain inactivity state data centrally. Each cloud service operates to track inactivity locally to that service, and all that is required is that the master service knows the identity of the service(s) to which the user is authenticated; as needed, the master service confirms a user's activity status by obtaining the status of the user with respect to one or more other cloud services. Based on the response information, the master service overrides an inactivity timeout to enable a desired user action. The approach scales as additional cloud services are provided, irrespective of the inactivity configuration or protocol that is enforced locally.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the inactivity tracking and management functionality is implemented in software, which includes but is not limited to firmware, resident software, microcode, and the like. Furthermore, the inactivity tracking and related functions can take the form of a computer program product accessible from a computer-usable or computer-readable non-transitory medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Storage devices may include removable media, such as SD cards. The computer-readable medium is a tangible, non-transitory item. Any of these devices can be used to store the authentication or other status information described above.

Any cloud datacenter resource may host an inactivity tracking component as described herein.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the inactivity tracking components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the cross-domain inactivity tracking functionality provided herein may be implemented as an adjunct or extension to an existing cloud compute management solution.

The techniques described herein may be used in any virtual client-server environments.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein are applicable to any distributed web application that comprises multiple components (e.g., in different domains) that do not allow for simple inactivity tracking in a single location. Thus, as used herein, a cloud computing infrastructure or a cloud service should be construed to include a distributed web application of this type.

Having described our invention, what we now claim is as follows:

1. A method of inactivity tracking and management in a cloud computing infrastructure, wherein information about a set of cloud services to which a user is authenticated is maintained within the infrastructure, comprising:
   receiving an indication that the user has attempted to take an action at a first cloud service following timeout of an inactivity period there;
   responsive to receiving the indication, identifying, from the information, a second cloud service as a service to which the user has previously authenticated and may still be active;
   responsive to identifying the second cloud service, querying, using software executing in a hardware element, the second cloud service to determine, based on an inactivity period at the second cloud service, whether the user is indicated to be still active at the second cloud service; and
   when a response is received indicating that the user is indicated to be still active at the second cloud service, issuing a reply to the indication, wherein the reply re-sets the inactivity period at the first cloud service, thereby enabling the user to take the action.

2. The method as described in claim 1 wherein an inactivity period at the first cloud service differs from an inactivity period at the second cloud service.

3. The method as described in claim 1 further including:
   querying at least a third cloud service to which the user has previously authenticated to determine, based on an inactivity period at the third cloud service, whether the user is indicated to be still active at the third cloud service; and
   wherein the reply re-setting the inactivity period at the first cloud service is issued if a response is received indicating that the user is indicated to be still active at either the second cloud service or at the third cloud service.

4. The method as described in claim 1 further including caching for re-use the response received as a result of the querying of the second cloud service.

5. The method as described in claim 1 wherein the information is maintained in one of: a data store, a cookie.

6. The method as described in claim 1 wherein the user authenticates to the first and second cloud services using single sign-on.

7. An apparatus, comprising:
a processor;
computer memory holding computer program instructions that when executed by the processor perform a method of inactivity tracking and management in a cloud computing infrastructure, wherein information about a set of cloud services to which a user is authenticated is maintained within the infrastructure, the computer program instructions comprising:
program code to receive an indication that the user has attempted to take an action at a first cloud service following timeout of an inactivity period there;
program code responsive to receipt of the indication to identify, from the information, a second cloud service as a service to which the user has previously authenticated and may still be active;
program code responsive to identification of the second cloud service to query the second cloud service to determine, based on an inactivity period at the second cloud service, whether the user is indicated to be still active at the second cloud service; and
program code operative when a response is received indicating that the user is indicated to be still active at the second cloud service, to issue a reply to the indication, wherein the reply re-sets the inactivity period at the first cloud service, thereby enabling the user to take the action.

8. The apparatus as described in claim 7 wherein an inactivity period at the first cloud service differs from an inactivity period at the second cloud service.

9. The apparatus as described in claim 7 further including:
program code to query at least a third cloud service to which the user has previously authenticated to determine, based on an inactivity period at the third cloud service, whether the user is indicated to be still active at the third cloud service;
wherein the reply re-setting the inactivity period at the first cloud service is issued if a response is received indicating that the user is indicated to be still active at either the second cloud service or at the third cloud service.

10. The apparatus as described in claim 7 further including program code to cache for re-use the response received as a result of the querying of the second cloud service.

11. The apparatus as described in claim 7 further including a data store in which the information is maintained.

12. The apparatus as described in claim 7 further including an authentication mechanism to authenticate the user to the first and second cloud services using single sign-on.

13. A computer program product in a non-transitory computer readable medium for use in a data processing system, the computer program product holding computer program instructions which, when executed by the data processing system, perform a method of inactivity tracking and management in a cloud computing infrastructure, wherein information about a set of cloud services to which a user is authenticated is maintained within the infrastructure, the computer program instructions comprising:
program code to receive an indication that the user has attempted to take an action at a first cloud service following timeout of an inactivity period there;
program code responsive to receipt of the indication to identify, from the information, a second cloud service as a service to which the user has previously authenticated and may still be active;
program code responsive to identification of the second cloud service to query the second cloud service to determine, based on an inactivity period at the second cloud service, whether the user is indicated to be still active at the second cloud service; and
program code operative when a response is received indicating that the user is indicated to be still active at the second cloud service, to issue a reply to the indication, wherein the reply re-sets the inactivity period at the first cloud service, thereby enabling the user to take the action.

14. The computer program product as described in claim 13 wherein an inactivity period at the first cloud service differs from an inactivity period at the second cloud service.

15. The computer program product as described in claim 13 further including:
program code to query at least a third cloud service to which the user has previously authenticated to determine, based on an inactivity period at the third cloud service, whether the user is indicated to be still active at the third cloud service;
wherein the reply re-setting the inactivity period at the first cloud service is issued if a response is received indicating that the user is indicated to be still active at either the second cloud service or at the third cloud service.

16. The computer program product as described in claim 13 further including program code to cache for re-use the response received as a result of the querying of the second cloud service.

17. The computer program product as described in claim 13 further including a data store in which the information is maintained.

18. The computer program product as described in claim 13 further including an authentication mechanism to authenticate the user to the first and second cloud services using single sign-on.

* * * * *